Figure 1:
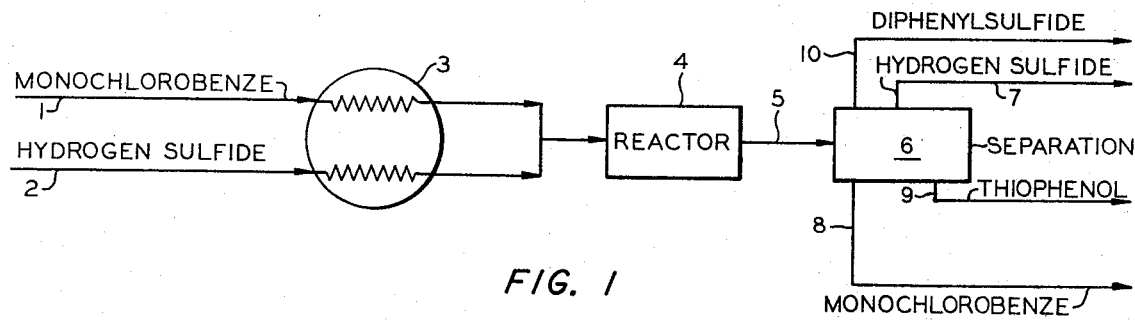

United States Patent [19]
Sherk et al.

[11] 3,799,989
[45] Mar. 26, 1974

[54] CLEAVAGE OF AROMATIC THIOETHER

[75] Inventors: Fred T. Sherk; Donald H. Kubicek, both of Bartlesville, Okla.

[73] Assignee: Phillips Petroleum Company, Bartlesville, Okla.

[22] Filed: July 29, 1971

[21] Appl. No.: 167,320

[52] U.S. Cl.................... 260/609 D, 260/609 E
[51] Int. Cl........................... C07c 149/28
[58] Field of Search................. 260/609 D

[56] References Cited
UNITED STATES PATENTS
1,825,662  10/1931  Hale.................... 260/609 D
2,490,257  12/1949  Crowley et al.......... 260/609 D FOREIGN PATENTS OR APPLICATIONS
455,531  2/1970  Japan.................. 260/609 D Primary Examiner—Lewis Gotts
Assistant Examiner—D. R. Phillips

[57] ABSTRACT

Aromatic thioether formed by reaction of $H_2S$ and chlorobenzene at an elevated temperature at which thiophenol is formed is caused to undergo cleavage with $H_2S$ to form additional thiophenol. The cleavage takes place under essentially the same or similar conditions as are acceptable for the formation of the thiophenol. The thioether can be subject to cleavage in the same or a reactor different from that in which thiophenol is being formed. Or, a reactor can be employed cyclically forming thiophenol and thioether and at a different time cleaving thioether.

6 Claims, 3 Drawing Figures

INVENTORS
F. T. SHERK
D. H. KUBICEK

BY

ATTORNEYS

CLEAVAGE OF AROMATIC THIOETHER

This invention relates to cleavage of an aromatic thioether. In one of its aspects it relates to cleavage of a thioether formed at elevated temperature in the reaction between a chlorobenzene and hydrogen sulfide.

In one of its concepts, the invention relates to the recycle to the original reactor in which chlorobenzene is being reacted with hydrogen sulfide at an elevated temperature to form thiophenol of the thioether also formed during said reaction, thus to cause cleavage of the thioether by $H_2S$ present in the reactor, therefore, increasing the yield of thiophenol in the process. In another of its concepts, the invention provides a process wherein thioether formed is recovered and subjected to cleavage with hydrogen sulfide in a separate reactor or zone. In a further concept, the invention provides a cyclically employed reactor in which at one time the principal reaction is simply the conversion of chlorobenzene and hydrogen sulfide to form thiophenol and unavoidably obtained thioether while at another time the principal reaction is that of cleavage of the aromatic thioether with hydrogen sulfide to form additional thiophenol.

While this invention will be described primarily with respect to the formation of thiophenol from cholorbenzene and hydrogen sulfide, it appears that the aromatic halogen can include one or more alkyl or other nonreactive groups which are stable during the reaction. For example, the alkyl group substituent on the aromatic ring can have from one to about five or more carbons. Also, in lieu of one or more alkyl substituents, other nonreactive substituents may be included. Presently, such groups as tolyl, xylyl and mesityl are considered.

The vapor phase reaction of hydrogen sulfide with chlorobenzene to yield thiophenol and diphenylsulfide (diphenyl thioether) as major products is known. Hydrogen chloride is formed as a co-product.

It has now been found that diphenylsulfide can be considered as a potential thiophenol because of the finding that the sulfide is readily cleaved to thiophenol with hydrogen sulfide under the conditions of the reaction in which the hydrogen sulfide reacts with the chlorobenzene to form thiophenol and diphenylsulfide. For sake of completeness, it is mentioned in passing, that benzene is normally the major by-product from the chlorobenzene-hydrogen sulfide reaction. Other by-products, which are formed in small amounts, are phenyldisulfide, thianthrene, and dibenzothiophene.

The cleavage of diphenylsulfide with hydrogen sulfide over an undisclosed catalyst has been reported. Japanese Pat. No 70-05531, February, 1970.

It is known that heating tertiary alkyl sulfides, as distinguished from an aromatic sulfide, with hydrogen sulfide at 85°–100° C. in the presence of an acidic catalyst (Filtrol 71) results in conversion to mercaptan. However, aromatic sulfide, more specifically, diphenylsulfide, does not undergo this type of cleavage. Thus, in an experiment, heating diphenylsulfide with excess hydrogen sulfide for 8 hours at 100° C. in the presence of Filtrol 71 produced very little (if any) thiophenol. The stability of aromatic compounds relative to aliphatic compounds is well known.

Ultimate yields of thiophenol, percent of theoretical, of 81–87 percent have been obtained, employing an excess of hydrogen sulfide over diphenylsulfide at elevated temperature and pressure. Thus, at about 8/1 molar ratio of hydrogen sulfide/diphenylsulfide, a temperature of approximately 1,000° F. and a pressure of about 180 pounds per square inch gauge with a residence time of about 20 seconds, there resulted diphenylsulfide conversions of 62–66 percent with ultimate yields of thiophenol based upon the original halogenated aromatic of 81–87 percent. Extension of the residence time to about 40 seconds at about 1,000° F. gave a 77 percent conversion and at 950° F. only 67 percent conversion. These data, here given, were obtained in connection with a hydrogen sulfide/chlorobenzene molar ratio in the range of from about 1.5 to about 2/1 in runs carried out in a jet-mix reactor.

Such a low ratio, according to the invention, and a concept basic thereto is possible because of the finding that the diphenylsulfide produced can be cleaved with hydrogen sulfide in the same or in a separate step to yield thiophenol for overall yields with the advantage of the invention that the minimizing of excess hydrogen sulfide present in any embodiment herein described considerably reduces the problems and costs of separation from by-product hydrogen chloride.

It is an object of this invention to produce cleavage of an aromatic thioether to thiophenol. It is another object of this invention to provide a unitary process for the conversion of a halogenated aromatic, e.g., chlorobenzene, to a thiophenol, specifically thiophenol, in high theroretical yield based upon the halogenated aromatic feed to the process. It is a further object of this invention to considerably reduce the costs and problem of separation of thioether, e.g., diphenylsulfide, from hydrogen chloride produced in the reaction of the halogenated aromatic with hydrogen sulfide when producing a thiophenol. It is a further object of the invention to reduce the kinds of as well as numbers of vessels or zones required in the production of a thiophenol by the reaction of a halogenated aromatic and hydrogen sulfide.

Other aspects, concepts, objects and the several advantages of the invention are apparent from a study of this disclosure, the drawing and the appended claims.

According to the present invention, thioether formed during the reaction of a halogenated aromatic and hydrogen sulfide at elevated temperature to produce a thiophenol is converted to additional quantity of thiophenol under essentially the same or similar conditions employed for the reaction of the halogenated aromatic and the hydrogen sulfide.

Also according to the invention, thioether separated from the effluent from the reaction zone in which the halogenated aromatic and hydrogen sulfide are reacted can be and is returned to said reaction zone for cleavage to thiophenol in presence of provided hydrogen sulfide.

Although the reactions described herein take place at rather high temperatures of the order of about 950° to 1,000° F. or higher, a contact mass which may have some catalytic effect can be employed. Presently, in the now preferred or best mode of operation of our invention, the reaction is considered essentially a thermal one albeit a filled reactor with essentially noncatalytic filler for mixing can be used. A refractory line jetmixed reactor has actually been used and is the reactor in which data given herein were obtained.

Normally, the halogenated aromatic, e.g., chlorobenzene and the hydrogen sulfide will be preheated before being fed to the reactor. The feed is arranged to cause good intermingling of the reactants in a very short time, of the order of a few seconds at the most.

Where recycled to the same reactor operated a recycled feed composed of approximately 80 mol percent chlorobenzene and approximately 20 mol percent diphenylsulfide at a temperature of the order of 1,000° F., a pressure of the order of about 180 pounds per square inch gauge, a residence time of approximately 20–30 seconds with a 1.6 mol ratio of hydrogen sulfide on the one hand to chlorobenzene and diphenylsulfide on the other, there has been obtained 62 percent chlorobenzene conversion and a three percent net conversion of diphenylsulfide, the ultimate yield of thiophenol, percent of theoretical, being 89 percent.

Considering the low ratio of hydrogen sulfide to chlorobenzene plus diphenylsulfide which can be employed according to the invention, the effluent from the reactor can be separated by distillation to obtain thiophenol as an overhead product and residual diphenylsulfide which is fed as recycle to the reactor, together with chlorobenzene.

It is now evident from the foregoing and that which follows that the invention provides three different manners of manipulating the effluent containing the thioether or sulfide, namely:

1. the thioether is recycled into the reactor and is there converted to additional thiophenol, while the reactor is operating under the conditions used to produce thiophenol and, of course, the sulfide from starting materials, 2. the thioether is separated from the reactor effluent and conducted to another reactor or, without separating the thioether, the effluent from the reactor is together with additional hydrogen sulfide fed to a second reactor in which thiophenol producing conditions are extant whereupon, when there has been no separation practiced upon the effluent from the first reactor, the effluent from the second reactor is subjected to a fractionation thus rendering possible only one fractionation for the total effluent from the two reactors, and 3. the same reactor is used cyclically, that is, during one portion of the cycle, thiophenol is produced with recovery of thioether from the reactor effluent and during another portion of the cycle the thioether is being converted to additional thiophenol in said reactor, i.e., the same reactor.

The following table records data on the cleavage of the diphenyl sulfide with hydrogen sulfide at the indicated conditions.

Thus, it has been found that diphenyl sulfide can be cleaved thermally with hydrogen sulfide to give thiophenol in high yield under conditions including those exemplified in the table above. Ultimate yields were lowered by extending the residence time to 40 seconds at 1,000° F. giving about 77 percent conversion or at 950° F., 67 percent conversion.

The heating of diphenyl sulfide with excess hydrogen sulfide for 8 hours at 100° C. in the presence of an acidic clay catalyst, i.e., Filtrol-71, did not produce any significant amount of thiophenol.

The process thus comprises generally the steps of a first reaction of hydrogen sulfide with an aromatic halide in a molar ratio of about 0.5:1 to about 10:1, preferably about 1:1 to 3:1 at a temperature between about 800 and about 1,100° F., preferably about 1,000° F. and a residence time of about 5–120 seconds, preferably about 20–60 seconds and a thermal cleavage step of the diphenyl sulfide (thioether) by-product under essentially similar conditions, simultaneously in the same reactor as it is being produced or as it can be recycled upon separation from the reaction zone effluent or thermally cleaving the by-product thioether in the presence of hydrogen sulfide using a hydrogen sulfide:-thioether molar ratio of about 1:1 to 10:1, preferably about 4:1, at a temperature of about 800°–1,100° F., preferably about 1,000° F. and a residence time of about 5–100 seconds, preferably about 20–40 seconds.

Usually pressures in the approximate range of about 0 to 500 psig are operative. Presently the preferred range is about 100 to 250 psig.

While a larger excess of hydrogen sulfide than 10:1 may be used, such large excess becomes economically unattractive.

The conditions now considered as specific concepts of this invention having been given, it is noted that the broad concept of the invention is at least in the discovery that the aromatic ethers (diaryl sulfide) can be cleaved as described. Conditions departing from those given may be used under some circumstances. The usual relationship between time, temperature and pressure obtain; a contact mass or catalyst may be used.

In the following table are given data obtained under conditions indicated therein.

TABLE I

CLEAVAGE OF $O_2S$ WITH $H_2S$
(180 psig; $H_2S/O_2S=8/1$ molar)

| Run No. | Reactor Type | Temp., °F | Res. Time, Sec. | $H_2S$ Vel., ft/sec. | $O_2S$ Conv., % | Ult. Yield, Mol % (b) | | | | |
|---|---|---|---|---|---|---|---|---|---|---|
| | | | | | | OSH | OH | DBT | $O_2S_2$ | TA |
| 1 | Plug flow (a) | 950 | 20 | — | 67.0 | 95.8 | 2.0 | — | 1.2 | 0.9 |
| 2 | Plug flow (a) | 1000 | 19 | — | 74.6 | 89.6 | 5.8 | 1.3 | 1.3 | 2.1 |
| 3 | Jet-mix | 950 | 20 | 160 | 49.7 | 85.8 | 8.7 | 2.5 | 1.7 | 1.2 |
| 4 | Jet-mix | 950 | 40 | 80 | 67.0 | 81.4 | 12.0 | 3.5 | 1.6 | 1.6 |
| 5 | Jet-mix | 1000 | 19 | 160 | 66.1 | 86.7 | 7.2 | 2.9 | 2.6 | 0.6 |
| 6 | Jet-mix | 1000 | 39 | 80 | 77.2 | 74.8 | 17.8 | 4.6 | 1.9 | 0.8 |
| 7 | Jet-mix | 1000 | 19 | 300 | 62.3 | 91.7 | 5.0 | 1.1 | 1.8 | 0.4 |

(a) The tube was packed with 4-A sieves.
(b) DBT is dibenzothiophene; TA is thianthrene.

TABLE II

DIPHENYL SULFIDE RECYCLE — JET MIX REACTOR
(180 psig; H₂S/OCl + O₂S 1.6 molar; res. time 27 sec.)

| Run No. | 8 | 9 | 10 | 11 |
|---|---|---|---|---|
| Temp. | 950 | 1000 | 925 | 960 |
| $H_2S$ Vel., ft/sec. | 200 | 200 | 200 | 200 |
| OCl conv., % | 37.8 | 62.3 | 16.8 | 32.2 |
| $O_2S$ conv., % (a) | 6.8 | 3.2 | 14.8 | 17.4 |
| Total conv., % | 44.6 | 65.5 | 31.6 | 49.6 |
| OSH per Pass Yield, mol % (b) | 26.2 | 38.8 | 15.2 | 24.3 |
| Ultimate Yields, mol % (c) | | | | |
| OSH | 93.6 | 89.2 | 95.4 | 93.0 |
| OH | 3.1 | 5.4 | 4.6 | 3.7 |
| DBT | 1.5 | 2.3 | 3.7 | 1.6 |
| $O_2S_2$ | 1.7 | 3.1 | | 2.8 |
| TA (d) | | 0.4 | | |
| Reactor productivity, (e) | | | | |
| (lb., OSH/HR./ft³ reactor vol.) | 22.6 | 32.3 | 14.2 | 21.5 |
| Feed, mol % (f) | | | | |
| OCl | 81.0 | 81.0 | 73.0 | 73.0 |
| $O_2S$ | 18.9 | 18.9 | 25.8 | 25.8 |
| OSH | | | 0.9 | 0.9 |
| $O_2S_2$ | 0.1 | 0.1 | 0.2 | 0.2 |
| TA | | | 0.2 | 0.2 |
| Effluent, mol % (f) | | | | |
| OH | 1.0 | 2.8 | 0.9 | 1.2 |
| OCl | 50.0 | 30.7 | 58.5 | 47.6 |
| OSH | 30.9 | 46.4 | 19.1 | 29.9 |
| $O_2S$ | 17.5 | 18.4 | 21.2 | 20.5 |
| DBT | 0.3 | 0.6 | 0.4 | 0.3 |
| $O_2S_2$ | 0.4 | 0.9 | | 0.6 |
| TA | | 0.1 | | |

(a) Apparent net conversion of $O_2S$.
(b) Percent of theoretical based on OCl plus $O_2S$ fed.
(c) Percent of theoretical based on OCl plus $O_2S$ consumed.
(d) TA is thianthrene.
(e) Calculated from residence time, feed composition, and per pass yield.
(f) $H_2S$ and HCl-free basis.

Referring now to the drawing, there is shown diagrammatically the steps of the invention or reactions which are involved.

FIG. 1, there is shown the reaction between monochlorobenzene and hydrogen sulfide.

Figure 2:
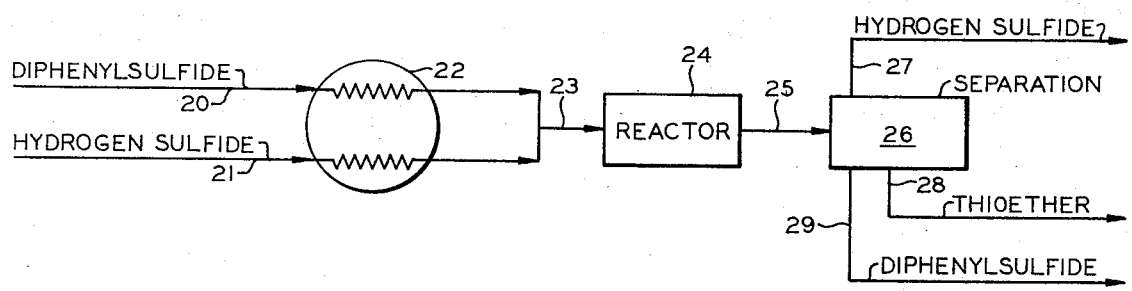

FIG. 2 there is shown the reaction between diphenylsulfide and hydrogen sulfide.

Figure 3:
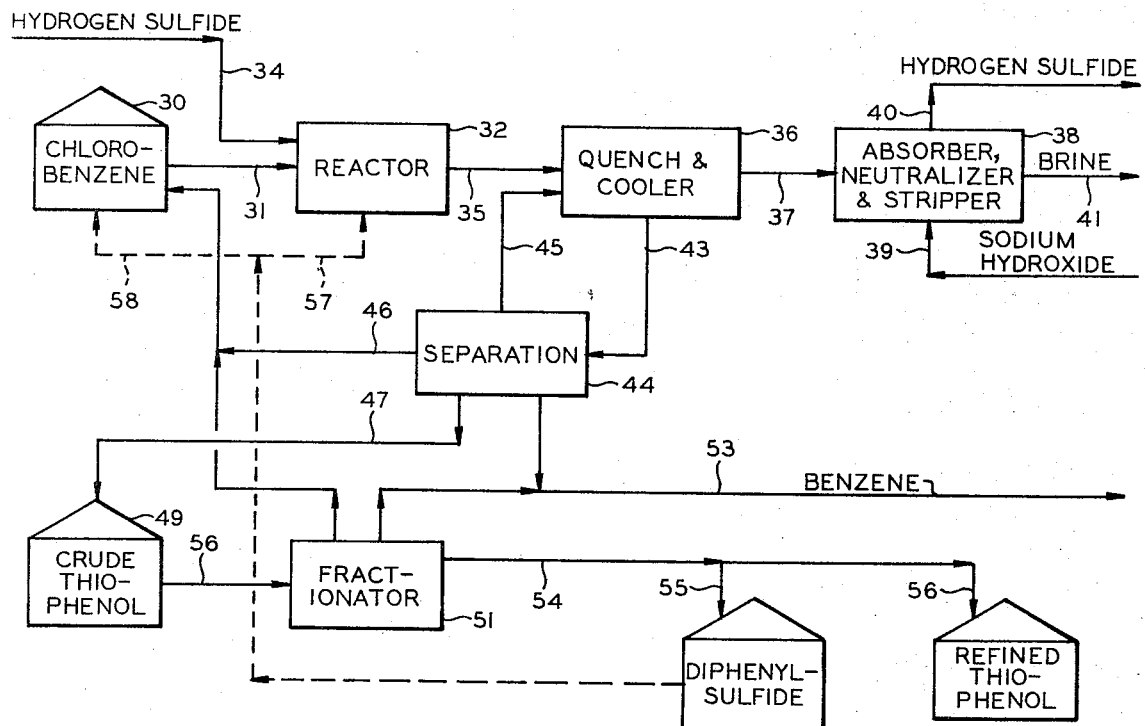

FIG. 3, there is shown a block flow diagram for thiophenol production indicating the recycle of diphenylsulfide to the reactor whereby all processing equipment to downstream of the reactor can be used to recover all of the thiophenol produced from the original starting materials as well as from the thioether or diphenylsulfide.

Referring now to FIG. 1, monochlorobenzene and hydrogen sulfide are fed by 1 and 2 into heater 3 wherein these reactants are preheated to about 900° F. and then to reactor 4 wherein the exothermistry of the reaction raises the temperature to about 1,000° F. Reactor effluent is passed by 5 to separation 6 from which there are recovered respectively through 7, 8, 9 and 10, hydrogen chloride and hydrogen sulfide, monochlorobenzene, thiophenol, and diphenylsulfide.

Referring now to FIG. 2, diphenylsulfide is passed by 20 with hydrogen sulfide from 21 into heater 22, wherein the temperature is raised to approximately 1,000° F. and from heater 22 by 23 into reactor 24. After reaction, the reactor effluent is passed by 25 into separation zone 26 from which there are recovered by way of 27, 28 and 29, respectively, only hydrogen sulfide, thioether and diphenylsulfide.

According to the invention as will be seen upon a study of this disclosure, the operations of FIG. 1 and FIG. 2 can be combined or as desired these operations can be performed sequentially, either employing two separate reactors or employing the same reactor cyclically as described.

Referring now to FIG. 3, chlorobenzene and in one embodiment diphenylsulfide are fed from storage 30 by 31 to reactor 32 for reaction with hydrogen sulfide fed to reactor 32 by 34. Reactor effluent is passed by 35 to quench and cooler 36 and thence by 37 to hydrogen chloride-hydrogen sulfide absorber, stripper and neutralizer 38 to which sodium hydroxide solution is fed by 39. Hydrogen sulfide and brine are removed by way of 40 and 41.

Returning now to quench and cooler 36, liquid condensed in 36 is passed by 43 to separation steps 44 wherein there are separated and removed therefrom by 45, 46 and 47 respectively, hydrogen sulfide and hydrogen chloride which is returned to the quench and cooler 36, chlorobenzene, which is passed by 46 and 48 to chlorobenzene storage 30, and thiophenol in crude form which is passed by 47 to storage 49. From 49, thiophenol is passed by 50 to fractionator 51 from which a residual amount of chlorobenzene is passed by 52 to chlorobenzene storage 30, by way of 48, benzene is taken off by 53 and diphenylsulfide and thiophenol are taken off by 54 and passed respectively to diphenylsulfide storage 55 and thiophenol storage 56. As earlier noted, diphenylsulfide can be returned to the reactor and in this embodiment it is returned by way of 57 to reactor and/or by 58 to chlorobenzene storage 30.

Reasonable variation and modification are possible within the foregoing disclosure, drawing and the appended claims to the invention, the essence of which is that in the production of thiophenol from hydrogen sulfide and chlorobenzene, for example, it has been found that diphenylsulfide produced in the reaction can be and is converted to thiophenol under the reaction conditions producing thiophenol from the hydrogen sulfide and the halogenated aromatic and that in the several embodiments respectively, the diphenylsulfide can be recycled to the reactor in which the reaction between hydrogen sulfide and the halogenated aromatic is occurring or optionally some or all of the diphenylsulfide can be converted to thiophenol in presence of additional $H_2S$ in another reactor under the said conditions with or without fractionation to recover the diphenylsulfide from the effluent from the reactor in which thiophenol is being produced by said reaction of halogenated aromatic and hydrogen sulfide and/or at least in part the diphenylsulfide can be converted to thiophenol by using a single reactor cyclically, as described, the process taking advantage of a single set of processing equipment, such as quench, cooler, absorber, stripper and neutralizer, stabilizer, compressor, halogenated aromatic recovery and other fractionation and even storage equipment.

We claim:

1. In a process for the production of a thiophenol by reaction of hydrogen sulfide and a halogenated aromatic which comprises bringing the reactants together in the reaction zone under conditions of reaction producing therefrom said thiophenol and unavoidably diaromatic sulfide (thioether), the step of essentially non-catalytically, thermally cleaving said diaromatic sulfide with additional hydrogen sulfide under said conditions thereby producing additional thiophenol said conditions comprising a molar ratio of hydrogen sulfide to halogenated aromatic of about 0.5:1 to about 10:1, preferably about 1:1 to about 3:1, a temperature in the range of about 800°–1,100° F., preferably about 1,000° F.; a residence time of about 5–120 seconds, preferably about 20–60 seconds; and a pressure in the range of about 0 to 500 psig, preferably about 100 to 250 psig.

2. A process according to claim 1 wherein the reactants comprise hydrogen sulfide and chlorobenzene.

3. A process according to claim 1 wherein the thioether is recovered from the reaction zone effluent and is returned to the reaction zone and there is present in the reaction zone sufficient hydrogen sulfide to convert at least a substantial portion of the thioether to thiophenol.

4. A process according to claim 1 wherein the reaction zone effluent is combined with additional hydrogen sulfide and passed to a second reaction zone in which also said conditions of reaction are maintained thereby causing thermal cleavage of said thioether.

5. A process according to claim 4 wherein the reaction effluent from the last-mentioned reaction zone is passed to fractionation, thereby fractionating only once from said reaction effluent all of the thiophenol formed in both reaction zones.

6. A process according to claim 1 wherein said reaction zone is operated cyclically, at least a portion of the cycle being operated to produce said thiophenol and at least another portion of said cycle being operated to produce additional thiophenol from thioether produced during said first-mentioned portion of said cycle.

* * * * *